United States Patent [19]

Ketchpel

[11] Patent Number: 5,396,406
[45] Date of Patent: Mar. 7, 1995

[54] THIN HIGH EFFICIENCY ILLUMINATION SYSTEM FOR DISPLAY DEVICES

[75] Inventor: Richard D. Ketchpel, Carpinteria, Calif.

[73] Assignee: Display Technology Industries, Westlake Village, Calif.

[21] Appl. No.: 12,336

[22] Filed: Feb. 1, 1993

[51] Int. Cl.⁶ .................................. G01D 11/28
[52] U.S. Cl. ........................... 362/27; 362/31; 362/84; 362/231; 359/48
[58] Field of Search .............. 362/26, 27, 30, 31, 362/224, 231, 260, 84; 359/50, 48, 54

[56] References Cited

U.S. PATENT DOCUMENTS

| | | | |
|---|---|---|---|
| 4,799,050 | 1/1989 | Prince et al. | 359/50 X |
| 5,121,233 | 6/1992 | Spencer et al. | 359/50 X |
| 5,267,062 | 11/1993 | Bottorf | 359/50 X |

*Primary Examiner*—Stephen F. Husar

[57] ABSTRACT

An illumination system for a display device includes an array of cylindrical lenslets for imaging an adjacent array of different color monochromatic emitting phosphor stripes onto the display device. Also included is a microcollimator reflector for each stripe which partially collimates emitted light from each phosphor stripe with respect to at least one axis of the display. An edge-irradiated energy distributor plate efficiently distributes ultra-violet energy by total internal reflection to the phosphor stripes that act as scattering and absorbing centers for the ultra-violet energy.

13 Claims, 4 Drawing Sheets

THIN HIGH EFFICIENCY ILLUMINATION SYSTEM FOR DISPLAY DEVICES

This invention relates to illumination systems for display devices and particularly to back illumination systems for color liquid crystal displays.

BACKGROUND DESCRIPTION OF PRIOR ART

Flat panel electronic displays are currently finding increased application due to the reduced depth requirement of the display as well as low power requirements in the case of large area displays. In particular backlighted color liquid crystal displays have shown a superior color gamut over the conventional color cathode ray tube display. Color is achieved in these LCD displays through use of a fluorescent lamp illumination on the back of the display with local control of transmitted light from the rear illuminator provided by triad groupings of red, green and blue pixel control elements. The fluorescent lamp contains an emission spectra showing intensity peaks for the red, green and blue components required to provide a full color gamut. The pixel control elements are typically composed of a twisted nematic liquid crystal with internal color filter at each pixel. The pixels are arranged in a row and column matrix which can be addressed electrically by row and column address electrodes so that each cell can be individually controlled in transmission to provide a required amount of colored light at that pixel. Matrix addressing of all the pixels in the display can provide a high fidelity color image exhibiting a continuous range in color as well as intensity.

The recent introduction of the notebook computer capitalizes on the high information density, high speed and low power requirements achieved through electronic microminiaturization. Notebook computers using monochrome LCD displays have received wide acceptance. A major problem in providing color displays to these computers is the power requirement of the backlight system as well as the cost of high contrast color LCD displays. The present invention addresses the illumination inefficiencies of existing color LCD's as well as the complexity and cost of the color LCD display.

Present notebook color LCD displays utilize a lightpipe type of backlight illumination system. The lightpipe is edgelighted along one or two edges of the plastic lightpipe with high efficiency fluorescent lamps. The lamps are small in diameter and contain a phosphor with peak intensities at the required red, green and blue color wavelength to produce a full color gamut display. The surface of the lightpipe contains optical discontinuities causing scattering of the internally transmitted light so that light escapes from the lightpipe at the scattering sites. The size of the scattering sites is adjusted as a function of the distance from the fluorescent lamp so that an even distribution of escaping light results from the face of the lightpipe. Typically the LCD incorporates the red-green-blue (RGB) filter array within the device. White light from the adjacent lightpipe is filtered to provide the appropriate color transmission for that pixel. At least 66% of the light is adsorbed by the filter since only one component of the three is transmitted. In practice less than 7% of the input light from the backlight is finally transmitted to the observer. Greater than 80% of the battery power on a color LCD notebook computer is spent in the backlight system.

Furthermore the diffuse light from the lightpipe illuminates the LCD pixel from many different incident angles. Most efficient modulation and best display contrast occurs for normally incident light rays so that a collimated backlight is desired. In the more simple (lower cost) LCD device using a super twist nematic (STN) display, contrast is inversely proportional to the duty cycle of addressing which is proportional to the number of matrix addressed lines in the display. The more expensive thin film transistor LCD (TFT-LCD) is used in order to provide a memory function at each pixel to overcome the duty cycle limitation and which results in display high contrast. Therefore a collimated backlight will allow use of the lower cost STN-LCD in place of the TFT-LCD for equivalent display contrast. For these reasons there is a need for a thin high efficiency backlight illuminator that eliminates the loss due to the color filters and also allows use of the lower cost STN-LCD technology.

Prior art describes rear illumination by means of a scattering box behind RGB interference filters located over slit apertures in register with RGB pixel elements of an adjacent LCD. Transmitted light through each filter is collimated by a cylindrical lens array onto the adjacent LCD (French, Stewart—U.S. Pat. No. 4,924,356 (1990)). While the interference filter is more energy efficient than an absorptive filter in that light energy outside the passband of the filter is reflected back into the scattering box, the efficiency of the scattering box is substantially less than a light pipe using total internal reflection as a propagation means for light distribution. In addition light collection efficiency for the cylindrical lens array for the scattered light input from the scattering box is at best 30%. Finally confining collimation Of the transmitted light from each aperture to pixel rows within the LCD in order to maintain color purity is very difficult by the proposed geometry. For instance a conventional VGA notebook LCD display contains 0.12 mm wide pixel rows under a 0.7 mm thick rear glass of the LCD so that a maximum diverge angle of ±5.6 degrees ($\tan^{-1}(0.06/0.7)$) results in order to preserve color purity. Likewise with an illumination aperture per pixel row as described in the prior art in which each aperture is 12% of the row width an aperture width of 15.6 microns results which is difficult and costly to fabricate in a large array.

Other prior art describes UV illumination of phosphor stripe patterns external to the LCD without any provision for maintaining color purity in high definition LCD displays as limited by the thickness of the rear glass of the LCD (Canter, Warg, Brooks—U.S. Pat. No. 4,668,049 (1987)). Yet other prior art describes collimation of backlight by means of lenticular lens arrays and subsequent diffraction of light into RGB lines patterns onto the pixel RGB rows of the LCD. Color separation of the white light by this technique is inefficient. The present invention addresses the limitations of the prior art and fulfills the needs for a thin high efficiency large area low cost color backlight for display devices.

SUMMARY OF THE INVENTION

An illumination system for a display device having a screen composed of multi-celled pixels for producing the primary color of light, and a light source for illuminating the screen includes means for ultra-violet excitation of selectively disposed different color emitting phosphor stripes to produce the primary colors of light whereby the light is selectively compressed in at least one direction to produce an increased on-axis light intensity. The system includes an edge illuminated ultraviolet distributor plate for illuminating the phosphor stripes. The system also includes means for focusing the collimated light from each different color phosphor stripe onto the corresponding pixel rows of the display thus avoiding the requirement for internal filters in the display device as well as prior art limitations on display color purity caused by the rear glass thickness of the LCD.

REFERENCE NUMERALS IN DRAWINGS

Figure 1:
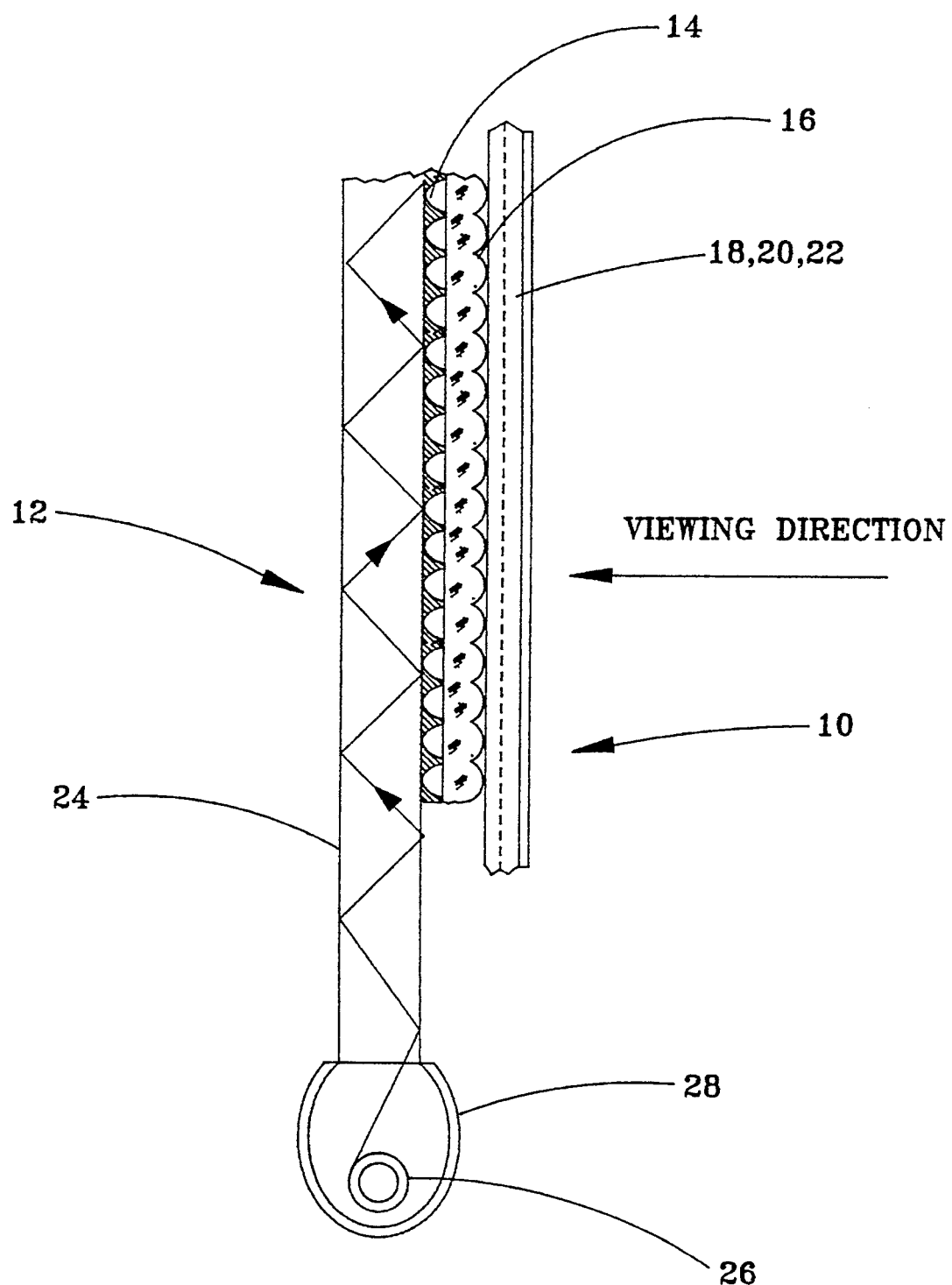
FIG. 1 is an overall profile view of the display system with the new backlight illuminator.

10 Liquid Crystal Display Device
12 Backlight Assembly
14 Microcollimator
16 Relay lens array
18 Red pixel row in LCD
20 Green pixel row in LCD
22 Blue pixel row in LCD
24 Light distributor plate
26 Fluorescent lamp
28 Lamp reflector
30 Red phosphor stripe
32 Green phosphor stripe
34 Blue phosphor stripe
36 Collimator groove surface
40 Phosphor stripe segment
42 Light input face of Distributor plate
44 Reflector coating
46 Rear glass of LCD
48 Combined collimator relay lens structure

DETAILED DESCRIPTION OF A PREFERRED EMBODIMENT

Figure 4:
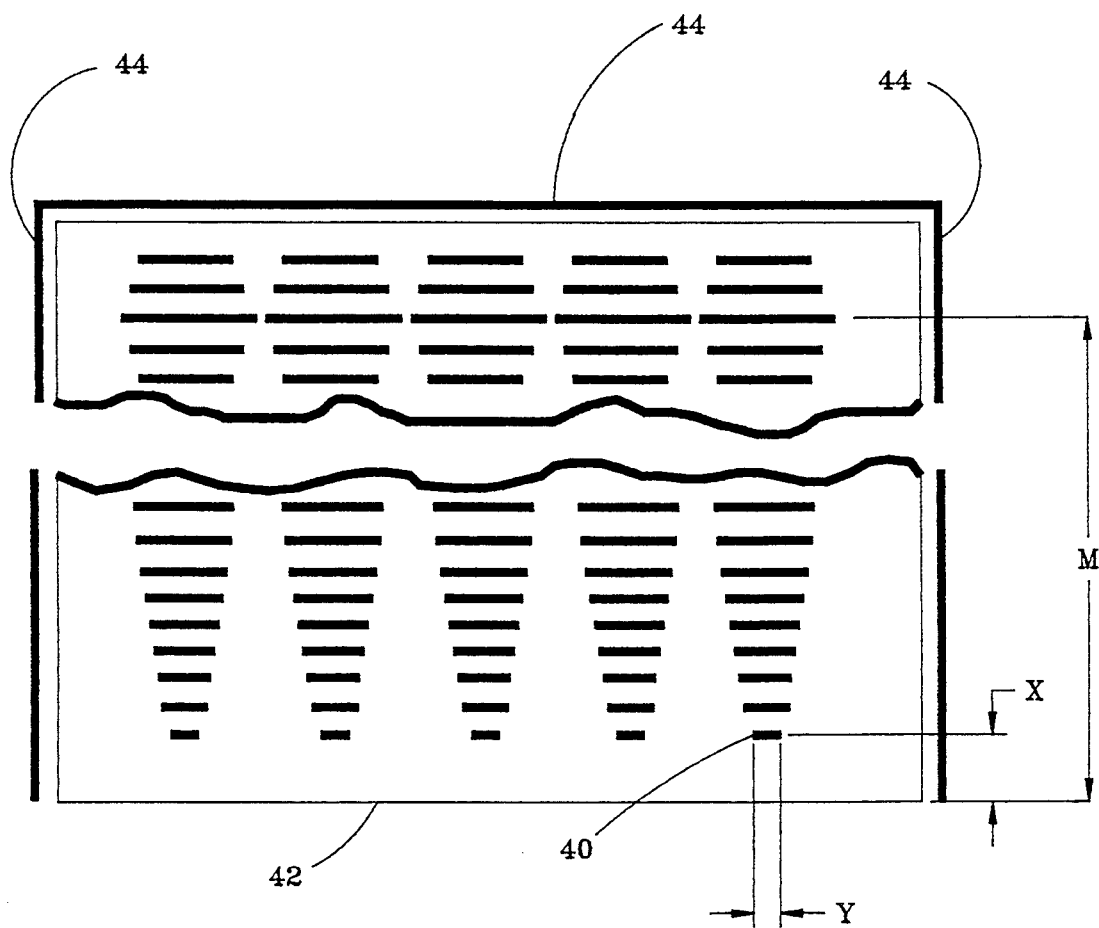
FIG. 4 is a plan view of the ultra-violet energy distributor sheet illustrating a preferred embodiment of the scattering sites for the distributor sheet.

FIG. 1 is an overall profile view of the Color LCD Display System which shows a preferred embodiment of a thin efficient backlight (12) mounted onto a conventional color STN-LCD matrix display (10). Structural details of the display device (10) which are not required for an understanding of the invention., and are well known in the art, are omitted for simplicity. The display device (10) includes a matrix of LCD cells such as (18), (20), (22) which individually transmit either red, green, or blue light as indicated by the R,G,B designation in the figure. By appropriate modulation of the transmission of a triad of these cells any color of light can be produced by the group. A means for focusing red, green, or blue light onto the R,G,B pixel rows includes an array of cylindrical lenses (16). The plane of the lens array (16) is substantially parallel with the plane of the display device (10). The longitudinal axes of the cylindrical lenses are arranged substantially parallel with the R,G,B designated rows (18, 20, 22) in the LCD matrix display (10). Sources of collimated R,G,B light are provide by the microcollimator structure (14). Red, green, and blue emitting phosphor stripes (30, 32, 34) are located at the apex of each microcollimator groove (36) more clearly seen in FIG. 2, an enlarged profile section of FIG. 1. Excitation of phosphor stripes (30, 32, 34) is provided by internally reflected ultraviolet (UV) light within the distributor plate (24). The granular phosphor powder provides scattering sites for the total internally reflected UV. UV light is provided to the distributor plate by a high efficiency 3 mm. diameter fluorescent lamp (26) located along the edge of the distributor plate (24). The UV fluorescent lamp is surrounded by an elliptical reflector (28) to further enhance energy transfer from the lamp to the input window of the distributor 2plate and also help maintain the lamp at optimum elevated operating temperature. The UV fluorescent lamp (26) includes a UV emitting phosphor such that the primary emitted radiation is between 300 and 400 nm wavelength with a preferred peak wavelength of 340 nm. The UV distributor plate is fabricated using commercially available UVT grade acrylic plastic sheet 2 mm. thick which exhibits high transmission for 340 nm light. The phosphor stripes are printed using R,G,B phosphor materials which are efficiently excited by the 340 nm radiation. In particular Sylvania Type 1152 (red), 1260 (green) and 1330 (blue) phosphors provide efficient conversion and color purity. The phosphor stripes (30, 32, 34) are printed onto the face of the acrylic distributor plate (24) in a particular segmented pattern to insure even emitted light intensity across the plate of the distributor as shown in FIG. 4. The width of each stripe is constant and substantially equal to the input width of the collimator groove (36) at the apex of the groove. The stripes are broken up into segments (40) as shown in FIG. 4. The pattern is foreshortened in FIG. 4 to exaggerate the change in segment length for clarity. The segment length (Y) is a function of the distance from the illuminating lamp (26). Experimentally the required segment length (Y) of each stripe as a function of distance (X) from the lamp end (42) of the distributor in the X direction can be expressed as:

$$Y = 2(1 - 0.1X)*(0.0022 + 0.00142 \, X^2).$$

In this case, the ratio of the stripe width to center to center stripe spacing was 0.2. The stripes were located in the Y direction on a center to center spacing equal to 8× the width of the stripe. A reflective coating (44) was applied to the three exposed edges of the distributor plate to reflect light approaching the edge of the plate back onto the scattering sites. A mirror image of the variation in stripe length was provided at the far end of the distributor to account for reflected energy. The mirror image axis occurred at M where "M" was equal to 85% of the total length of the distributor plate as shown in FIG. 4.

The focal length of the cylindrical lenses (16) can be chosen such that a compressed image of the phosphor stripes results on the LCD pixel rows. In this case a relatively coarse phosphor stripe pattern and collimator structure can be used for a fine definition LCD color display. For instance in a projection display only three stripes are necessary (single R,G,B) if display depth is not of significance. A further function of the cylindrical lens array (16) is to provide for selective illumination of pixel rows within the LCD where the thickness of the rear glass of the LCD (46) is equal to or much larger than the width of the pixel row inside the LCD. Prior art assumes that the color filter can be located over the pixel row on the outside of the display with negligible spreading of the filtered light to adjacent pixel rows. Present color LCD displays contain RGB pixel elements less than 0.14 mm wide. At present the minimum LCD rear glass thickness is 0.7 mm so that appreciable spreading of filtered color light would occur without the use of a relay lens array (16).

The pitch of the cylindrical lens array is chosen to minimize the depth of the lens system while at the same time large enough for low cost manufacturing procedures to provide adequately resolved illumination of the individual pixel rows: a preferred embodiment uses a pitch of 53 lenses per inch.

Figure 2:
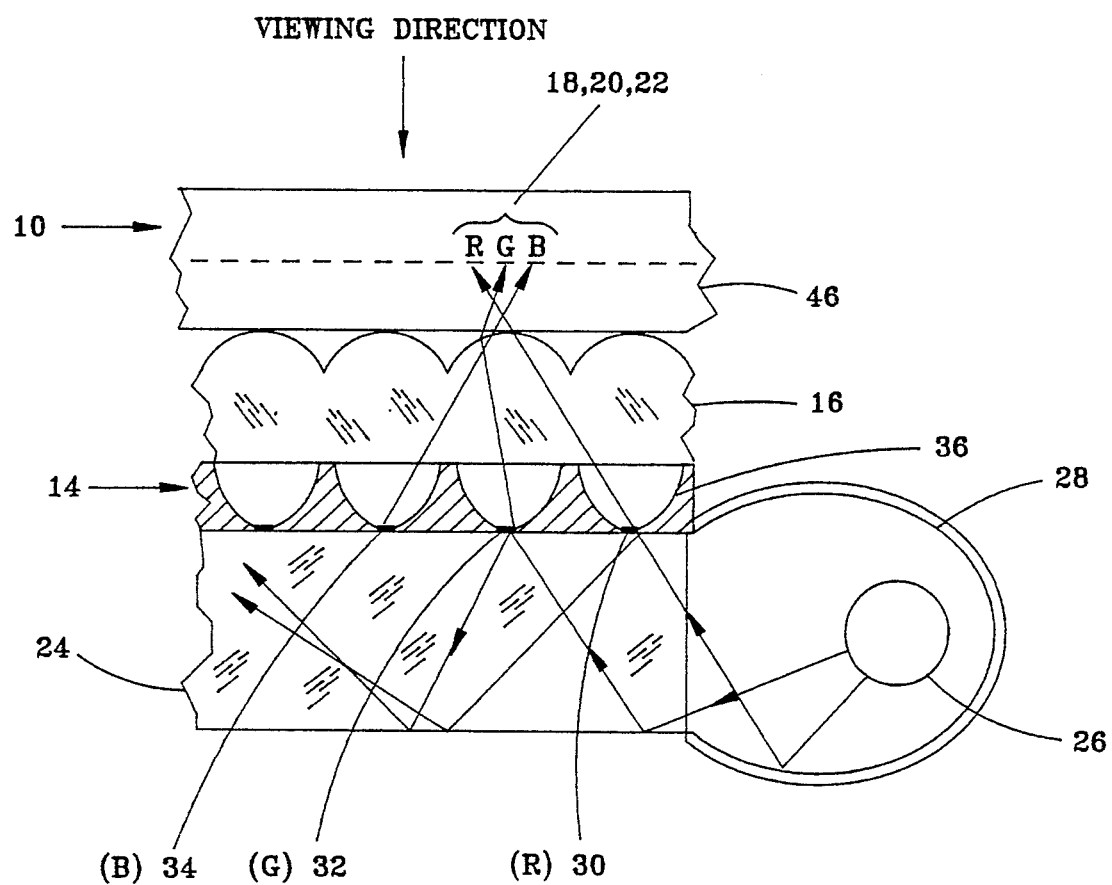
FIG. 2 is an enlarged section of a preferred embodiment.

The micro-collimator (14) contains a parabolic like profile (36) for each groove. The pitch of the collimator matches the pitch of the phosphor stripe pattern (30, 32, 34) 23 so that only a single color stripe is located in each collimator groove. FIG. 2 is a cross section of one preferred embodiment in which the collimator groove (36) is air filled with reflecting surfaces on the parabolic-like surface of a solid plastic member (14). In this case light emitted by the phosphor stripe over a ±90° range with respect to a normal to the stripe surface is collected and redirected by the parabolic-like reflecting surfaces.

Figure 3:
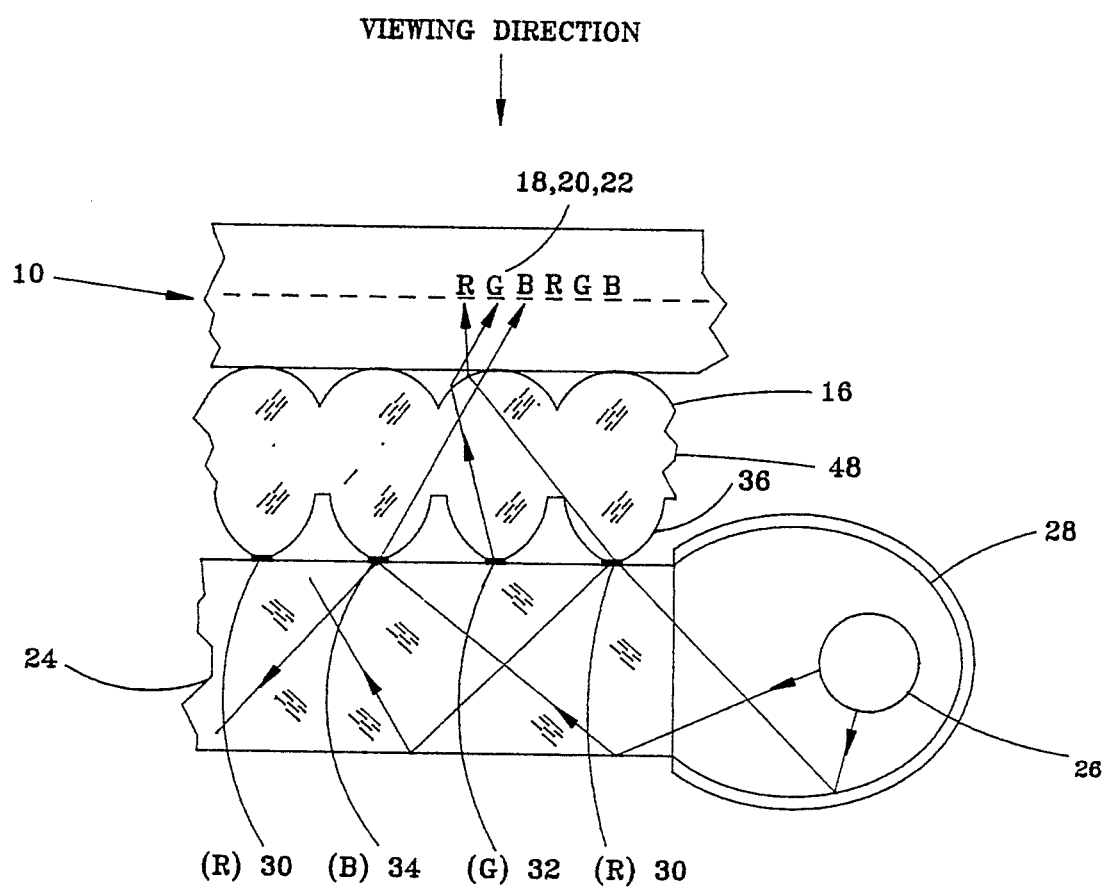
FIG. 3 is an enlarged section of a second preferred embodiment.

FIG. 3 is a second preferred embodiment where the collimator (48) consists of clear plastic shaped with a parabolic like profile. In this case light is concentrated by total internal reflection at the parabolic-like surfaces. Surface reflections at the input and output of the collimator at the plastic/air interfaces reduces the optical efficiency. However this structure is lower cost to fabricate than the open collimator. In this case the cylindrical lens surface (16) may be incorporated into the collimator structure for simplicity of manufacture.

The parabolic-like profile (36) is optimized depending upon whether filled with clear plastic or air. In the case of air a preferred embodiment contains a profile described by the mathematical equation:

$$Z = 0.5R^2/[1+\sqrt{(1-0.05R^2)}]$$

The distance of each surface from the optic axis of the collimator is equal to $R'$ where $$R' = R - (0.00527) \text{ in inches}$$

$Z$ is the distance along the optic axis of the collimator element which is perpendicular to the display surface. The phosphor stripe is located at the input window to the collimator which is located at $Z=0.04774$ in the above equation as expressed in inches. Thus the input window is nominally 0.0045 inches in width. The collimator thickness is 0.025 inches and the collimator elements are located on 0.025 inch centers. In the case of an epoxy filled parabolic-like profile the equation describing the preferred embodiment is as follows:

$$Z = 0.3635R^2/[1+\sqrt{(1-0.0188R^2)}]$$

with a similar $Z$, $R$, $R'$ coordinate system and input window as described above.

It should be noted that the thin high efficiency backlight structure described also functions with the thin-film transistor LCD also even though the STN-LCD structure is a less costly display assembly. Also an edge lighted distributor panel has been described using a cold cathode fluorescent tube as a light source. It should be recognized by those skilled in the art that the new backlight will also increase the system luminous efficiency using alternative slit sources of light into the collimator structure. For instance a multi-color electroluminescent source with electrodes only applied in the slit area would provide improved backlight efficiency compared with the normal full area electroluminescent backlight. Likewise local illumination of the slit input to the collimator with a multi-color gas discharge device or multi-color light emitting diodes in each case would provide improved backlight efficiency through vertical compression of the emitted light and removal of the internal filter requirement on the LCD. Although maximum power efficiency is realized by complete removal of the internal color filters in a normal LCD, efficiency improvement still results when said filters are not removed such as might be desired for viewing the display by reflected daylight rather than just backlight. In this case peak transmission of the normal absorptive filter can be as high a 80% so that energy loss for the monochromatic RGB components through the corresponding filters would only be a small fraction of the light loss compared with white light transmission, i.e. 67% loss for white light compared with 20% loss for monochromatic light. Therefore the new backlight illuminator will provide a substantial improvement even when used with conventional color LCD displays containing internal RGB filter arrays.

The above improvements provide a factor of 10× improvement in backlight efficiency for color LCD displays: 3× improvement due to elimination of color filter loss and 3+ improvement due to on-axis light concentration through use of the collimator structure. It will be obvious to those skilled in the art that a monochrome display can provide a 3+ improvement in power efficiency through use of the collimator structure. In this case a white emitting fluorescent lamp is used with the same distributor plate, and the relay imaging lens need not be used. Therefore, a monochrome version also falls within the intent of this invention.

What is claimed is:

1. An illumination system for a display screen device having a screen composed of multicelled pixels for selectively controlling the intensity of light wherein said illumination system comprises:
   means for remotely energizing a plurality of parallel luminescent stripe areas; and
   reflective means for concentrating the emitted light from said stripe areas in a vertical plane which is perpendicular to said stripe areas and also perpendicular to said display screen while maintaining a non-directive emission pattern of said light in a horizontal plane which is also perpendicular to said display screen whereby a wide horizontal viewing angle is preserved for ease of viewing by a group of side-by-side observers.

2. The illumination system of claim 1 wherein said means for energizing said stripe areas comprise:
   a transparent sheet of material containing luminescent sites disposed in a stripe pattern and
   at least one linear radiation source aligned with said stripe pattern and in close proximity to one edge of said transparent sheet; and wherein the reflective means comprises
   a two sided collimator reflector for each said stripe positioned such that the plane of said stripe is contained within said collimator reflector.

3. The illumination system of claim 2 wherein said luminescent sites are disposed in a segmented stripe pattern such that segments of length "Y" are uniformly spread on a constant pitch along every stripe and the length "Y" of each said segment is a function of the distance from said linear radiation line source wherein length "Y" increases in proportion to $X^n$ for said constant width stripe and "X" is the distance of said stripe from said linear radiation source while "n" is a number from 1.7 to 3.

4. The illumination system of claim 2 wherein said luminescent sites comprise ultra-violet excited, visible light emitting phosphor segmented stripes; and said radiation source comprises at least one ultra-violet emitting linear radiation source.

5. The illumination system of claim 4 wherein said phosphor stripes are arranged in repeating parallel triads aligned with pixel control lines in said display device in which each triad consists of one red emitting stripe, one green emitting stripe, and one blue emitting stripe; and emitted light from each stripe is concentrated by a separate collimator reflector for each stripe which confines said red, green and blue emitted light to corresponding red, green and blue pixel control lines in said display device.

6. The illumination system of claim 5 wherein emitted light from each color emitting stripe is imaged by means of a cylindrical lens array onto remotely located pixel control lines whereby vertical concentration of said emitted light provides increased brightness and a wide horizontal viewing angle is preserved for ease of viewing by a group of side-by-side observers.

7. The illumination system of claim 4 wherein said reflective concentrating means comprise solid transparent prisms containing reflecting sidewalls which are located in optical contact with and centered in register with each stripe such that emitted light is re-directed in a vertical direction normal to the plane of said display device while maintaining a non-directive emission pattern in the horizontal plane whereby the reflector structure is simplified for manufacture.

8. An illumination system for a display device having a screen composed of multicelled pixels for intensity modulating the primary colors of light, and a light source for illuminating said screen, said illumination system comprising:

means for energizing different color phosphor stripes in alignment with multicelled pixel control elements; and reflective means for concentrating the emitted light from said phosphor stripe toward said screen in one dimension in a vertical plane while maintaining a non-directional emission pattern in the orthogonal horizontal plane whereby a wide horizontal viewing angle is preserved for ease of viewing by a group of side-by-side observers.

9. The illumination system of claim 8 wherein said means for energizing said color phosphor stripes comprise:

a sheet of material transparent to ultra-violet radiation containing ultra-violet scattering sites on one side of said sheet; and at least one ultra-violet extended line source aligned parallel with said phosphor stripes and in close proximity to one edge of said sheet.

10. The illumination system of claim 8 wherein said color phosphor stripes are disposed in a segmented stripe pattern such that segments of length "Y" are uniformly spread on a constant pitch along every stripe and the length "Y" of each said segment is a function of the distance from said ultra violet extended line source wherein length "Y" increases in proportion to $X^n$ for said constant width stripe and "X" is the distance of said stripe from said ultra violet extended line source while "n" is a number from 1.7 to 3.

11. The illumination system of claim 10 wherein said stripe patterns comprise sequential groups of red, green and blue emitting phosphors in which each stripe is a single color emitting phosphor.

12. The illumination system of claim 8 wherein emitted light from each color emitting stripe is imaged by means of a cylindrical lens array onto remotely located pixel control lines whereby vertical concentration of said emitted light provides increased brightness and a wide horizontal viewing angle is preserved for ease of viewing by a group of side-by-side observers.

13. The illumination system of claim 8 wherein said reflective concentrating means comprise solid transparent prisms containing reflecting sidewalls which are located in optical contact with and centered in register with each stripe such that emitted light is re-directed in a vertical direction normal to the plane of said display device while maintaining a non-directive emission pattern in the horizontal plane whereby the reflector structure is simplified for manufacture.

* * * * *